(12) United States Patent
Bouissiere

(10) Patent No.: US 8,035,757 B2
(45) Date of Patent: Oct. 11, 2011

(54) ANTI-SLIP MOUNTING ALIGNMENT SYSTEM

(75) Inventor: Michael F. Bouissiere, Yorba Linda, CA (US)

(73) Assignee: Premier Mounts, Anaheim, CA (US)

( * ) Notice: Subject to any disclaimer, the term of this patent is extended or adjusted under 35 U.S.C. 154(b) by 1633 days.

(21) Appl. No.: 11/359,904

(22) Filed: Feb. 22, 2006

(65) Prior Publication Data

US 2006/0279665 A1   Dec. 14, 2006

Related U.S. Application Data

(60) Provisional application No. 60/655,154, filed on Feb. 22, 2005.

(51) Int. Cl.
*F16M 11/00* (2006.01)
*H04N 5/645* (2006.01)

(52) U.S. Cl. .......................... 348/825; 248/201; 248/917

(58) Field of Classification Search .................. 348/825, 348/836; 248/917, 201, 220.43, 276.1, 284.1, 248/285.1, 286.1

See application file for complete search history.

(56) References Cited

U.S. PATENT DOCUMENTS

2005/0167549 A1 * 8/2005 Ligertwood ............... 248/122.1

* cited by examiner

*Primary Examiner* — David Ometz
*Assistant Examiner* — Dillon Durnford-Geszvain
(74) *Attorney, Agent, or Firm* — Altera Law Group, LLC

(57) ABSTRACT

The system of the invention involves an anti-slip alignment plate used with a mounting bracket for mounting a device, such as a flat video screen having video mounting holes. The anti-slip plate is aligned with protrusions, or other means, with a plurality engagement members on the bracket which receives the protrusions. Once the plate and bracket have mated in a particular position, a fastener can secure the plate, bracket and device together. The result is that the fastener need not be torqued so tightly because slippage is prevented by the engagement points on the anti-slip plate. Furthermore, the number of position available for the anti-slip plate to secure the device is often substantially greater than would be achieve if the bracket merely had series of adjacent mounting holes.

24 Claims, 5 Drawing Sheets

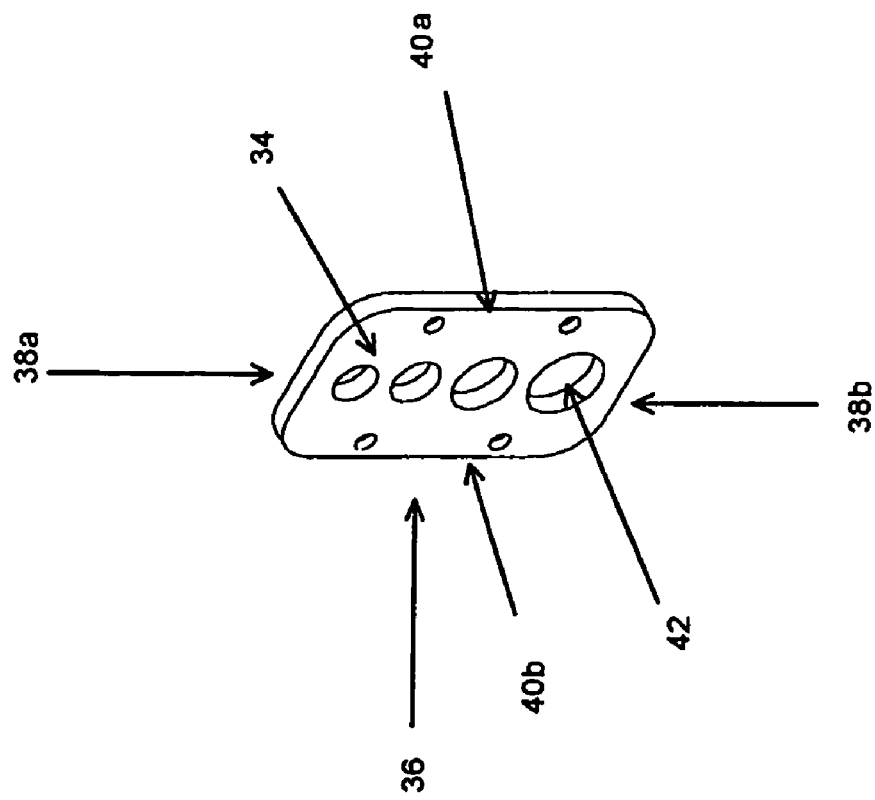

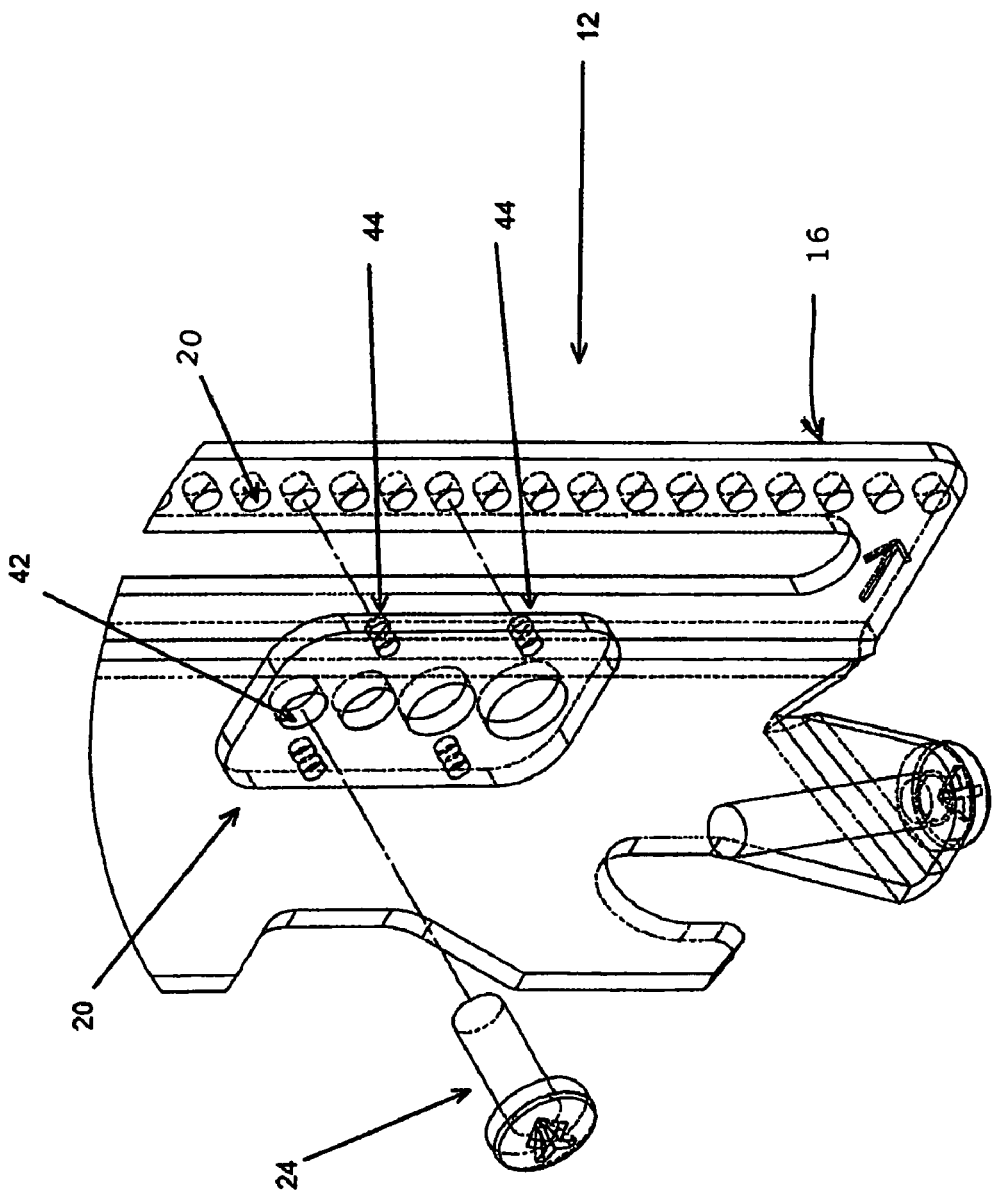
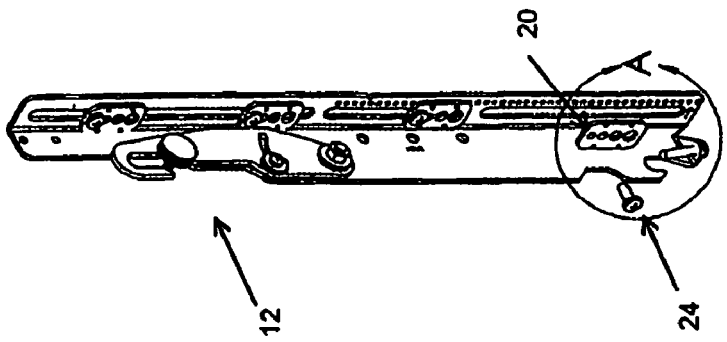

ANTI-SLIP MOUNTING ALIGNMENT SYSTEM

CROSS-REFERENCES TO RELATED APPLICATIONS

The present application claims the benefit of U.S. Provisional Application Ser. No. 60/655,154 filed on 22 Feb. 2005, the complete subject matter of which is hereby incorporated herein by reference in its entirety.

BACKGROUND OF THE INVENTION

1. Field of the Invention

The present invention relates to an apparatus and method for mounting an apparatus with a bracket. This invention is particularly advantageous for a flat panel video screen.

2. Background

Mounting brackets are necessary for many purposes. For example, a flat video screen, is thin in comparison to the depth of conventional cathode ray video screens and lends itself to wall or ceiling mounting. Flat panel video displays offers high video resolution, a larger surface area for display, and less weight than older video screen technologies but they are still awkward to manipulate when mounting. Additionally, because thinness of the screen type is a strong virtue, it is important to mount such devices as close to the wall as possible. This makes access to mounting holes more difficult for the installer to see as the screen and bracket are often tight to the wall during and after installation.

Flat panel video screens are expensive, and any mounting systems for the plasma video screen must be able to securely connect to the plasma video screen. The problem is that there are many manufacturers of such devices and no comprehensive standardization of the mounting holes. Consequently, to make a mounting apparatus capable of connecting different models requires that slots not holes be provided to mate with as many brands as possible.

However, there are dedicated mounting apparatus made for particular brands. A dedicated mounting apparatus for a particular brand can use a screw hole in the bracket or a slot in the bracket through which a screw connects to attach to the video screen holes on the back of the video screen. A drawback of a dedicated system with a screw hole in the bracket is that users can over torque the screw when connecting the bracket to the back of the video screen. A drawback of a dedicated system with a slot in the bracket is that the shear factor increases for connecting the screw to the back of the video screen.

As discussed above problems exist for a screw hole and a slot in a mounting bracket. The problems are exacerbated when the material into which the screws are tightened is a soft material. For example, as in the case of the hole in the back of a video display screen, the material is soft. The installer can have a tendency to over tighten the screws in a screw hole of a soft material. In the case of a slot, the installer can be concerned about slippage within the slot, and over-tighten.

These dedicated mounting systems also lack the flexibility to allow a broad range of alignment for the flat video screen, and at the same time provide a secure connection for the video screen. The mounting systems should permit the user to easily adjust or align the position of the video screen up or down on the mounting apparatus according to the user's preferred height of the screen.

As popularity of the flat panel video screens has flourished, the numbers of different models of screens have likewise continued to grow. The increase in numbers of screens means that a seller of mounting kits needs more space to stock a variety of different dedicated kits to service customers.

Thus, a need exists for an apparatus and mounting system for various devices such as a flat video screen that can securely connect a variety of different models of display to a bracket without the drawbacks of the dedicated mounting apparatus. A need further exists for an apparatus and mounting system that permits a greater range of alignment than a dedicated mounting system without affecting the secure attachment of the apparatus to the device.

BRIEF SUMMARY OF THE INVENTION

The apparatus and mounting system of the present invention solves those needs. Reference should be had to the claims for a definition of the invention. The following summary is provided merely to prepare the reader of the full specification to gain a better understanding thereof.

One aspect of the invention includes an anti-slip mounting alignment system for mounting a device having fastener receiving holes comprising a bracket member attachable to the device to be mounted; said first member having an elongated slot and a plurality of spaced apart engagement members adjacent to said elongated slot; and an anti slip alignment plate having first and second adjacent regions, said first region having an aperture for said fastener and said second region having at least one mating engagement member configured to engage at least one engagement member on said first bracket member, whereby said alignment plate aperture and said elongated slot are alignable to receive a fastener with said engagement members being engaged to prevent movement of said plate relative to said bracket.

According to another aspect of the invention, the engagement member on said plate includes at least on protrusion and the engagement member on said bracket includes a plurality of spaced part receivers sized to receive said protrusion.

According to another aspect of the invention, the plate includes a plurality of spaced apart apertures of different diameters to receive different sized fasteners.

According to another aspect of the invention, the plate includes at least one protrusion on either side of the apertures, so that the plate may be used upside down.

According to another aspect of the invention, the engagement members on said bracket are equally spaced apart.

According to another aspect of the invention, the engagement members on said bracket are depressions.

According to another aspect of the invention, the plate includes at least two spaced apart engagement members, so that the orientation of the plate is fixed at two points.

According to another aspect of the invention, the anti-slip plate has at least four protrusions, two on either side of the aperture.

According to another aspect of the invention, there is a method of aligning and fastening a bracket to a device having a fastener receiver, with a fastener comprising the steps of:
a) providing a bracket having an elongated slot and a plurality engagement points adjacent to and spaced part along said slot
b) providing a grip plate having an aperture for a fastener and a plurality of engagement points mateable with said engagement points of said bracket;
c) mating said engagement points on the grip plate and bracket at the desired position, to immobilize the grip plate relative to the bracket, thereby causing the aperture to align with the slot;
d) inserting a fastener through said aperture and slot and into said fastener receiver to secure said device to said bracket.

According to another aspect of the invention, there is a method of minimizing the required torque on an attachment fastener to prevent slippage between a bracket and a device to be attached to the bracket, comprising the steps of:

a) providing a bracket having an elongated slot and a plurality engagement points adjacent to and spaced part along said slot b) providing a grip plate having an aperture for a fastener and a plurality of engagement points mateable with said engagement points of said bracket;

c) mating said engagement points on the grip plate and bracket at the desired position, to immobilize the grip plate relative to the bracket, thereby preventing slippage between the bracket and the device;

d) inserting a fastener through said aperture and slot and into said fastener receiver to secure said device to said bracket.

The user can attach the anti-slip plat to the bracket holding the device to a foundation or base piece that connects to a wall or other structure. It is often the case that a foundation or base piece will be connected to the wall or other structure for added support.

BRIEF DESCRIPTION OF THE SEVERAL VIEWS OF THE DRAWINGS

FIG. 4 illustrates a side and back perspective view of the grip plate of the invention.

FIG. 7a illustrates a perspective view of the grip plate fitting into grip holes of an angled member connecting the anti-slip grip bracket according to the invention.

FIG. 7b illustrates an exploded view of 7a showing the grip plate fitting into grip holes connecting the anti-slip grip bracket according to the invention.

DETAILED DESCRIPTION OF THE INVENTION

Figure 1:
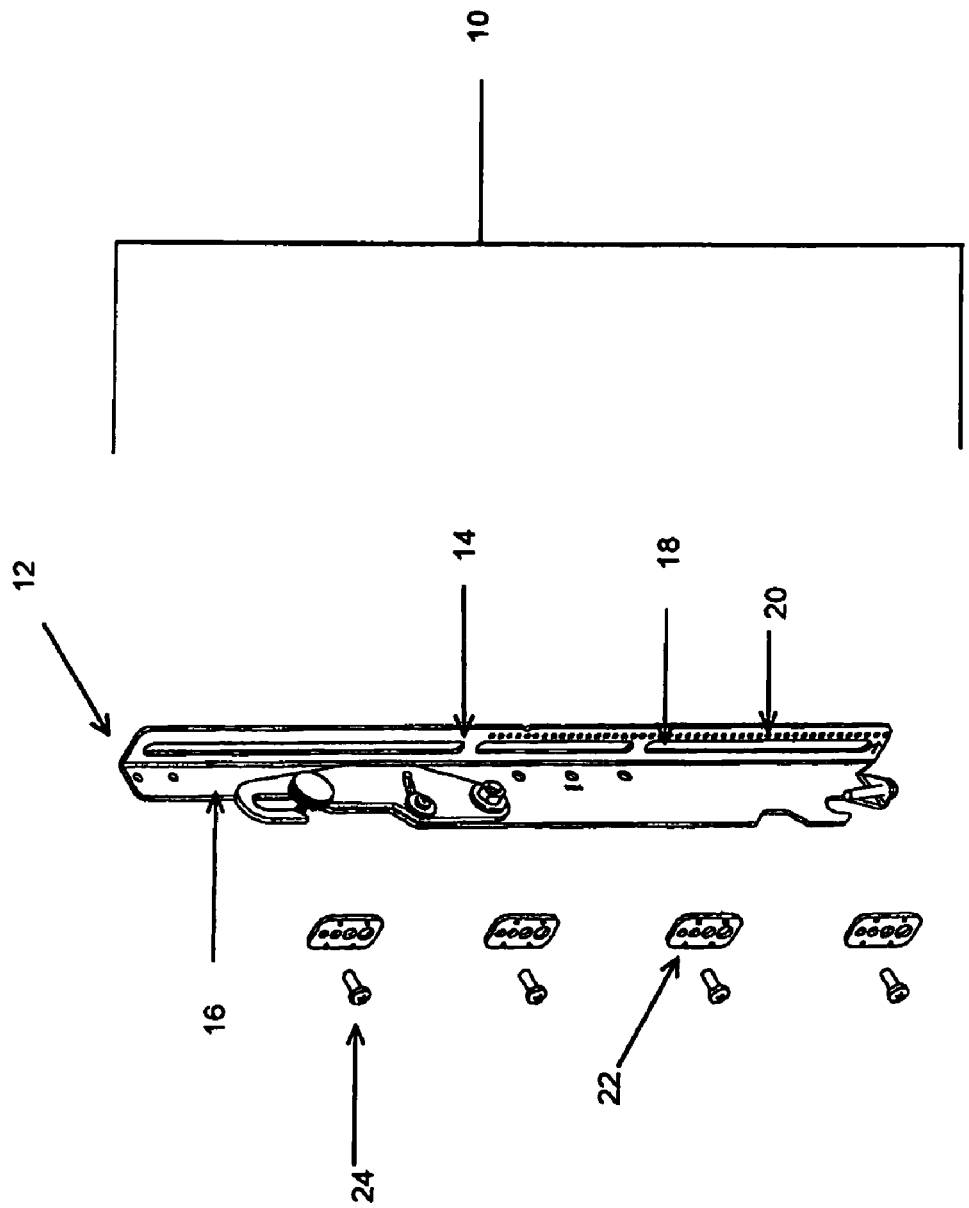
FIG. 1 illustrates an exploded view of an anti-slip grip bracket of the present invention broken down into angled members, grip plates, and screws for connecting the anti-slip grip bracket to the back of a flat video screen (not shown).

The mounting system of this invention provides a secure method to align and connect an anti-slip/grip bracket to the back of an apparatus or device, for example, a flat panel video screen. While the invention is described in terms of mounting an anti-slip grip bracket to a video screen, it is not intended to be so limited. There are many other devices for which the invention can be used, and obtain the beneficial attributes of the anti-slip grip bracket. Where there is a need for a secure connection that does not slip, thereby avoiding the slippage or torque problems associated with slots or screws, this invention offers a good solution. The flat panel situation is especially appropriate and this therefore used as the device for the preferred embodiment, but it is only exemplary. Flat panels have the characteristic that they are awkward to mount because of their size and the fact that their mounting brackets are often hard to reach from the side of the screen. Furthermore, errors in alignment are easily noticed. Finally, flat panel manufacturers are interested in keeping their devices as light as possible and thus use soft metals for their threaded mounting holes. This means that over-torquing is a problem, yet it is essential that the mounting be safe and secure. The anti-slip plate addresses these problems.

One embodiment of the invention provides an anti-slip/grip bracket or plate for mounting a device having screw holes on the back of the device, to a foundation comprises: a) an angled member having a device connection component that fits against the back of the device, and a foundation connection component that connects to the foundation; b) the device connection component having a substantially central elongated slot and a plurality of grip plate holes adjacent to or part of the substantially central elongated slot; and c) a grip plate having a middle portion and periphery portions, said middle portion having a screw hole and a plurality of protrusions near at least one of the periphery portions, and said protrusions spaced apart to fit into the plurality of grip plate holes of the device connection component. As discussed below, the invention is very useful for mounting a device, such as a flat panel video screen, that has a substantially flat back.

When the user obtains the desired alignment and connection to the device, such as a flat video screen as the device, he/she can connect the anti-slip grip bracket system to a foundation or base for connection to a wall or other structure. An exemplary foundation or base mounting system is shown in U.S. patent application Ser. No. 10/134,567 filed Apr. 26, 2002 herein incorporated by reference.

The anti-slip grip bracket of the present invention does not suffer from the drawbacks of the dedicated systems using a screw hole in a bracket or a slot in a bracket for directly screwing a screw into the video screen holes on the back of the video screen. Positioning a grip plate of the present invention between the screw to be screwed into the video screw hole on the back of the video screen eliminates the over torque and shear factor problems of the systems using dedicated holes for every adjustment position and slots which are prone to slippage.

Moreover, the user can now more readily adjust or align the position of the plasma video screen up or down on the mounting apparatus according to the user's preferred height of the screen. The protrusions on the grip plate fit into the device connection component (or bracket) having a plurality of grip plate holes adjacent to a substantially central elongated slot, which in the case of a video screen, is more precisely called a screen connection component. Thus, the grip plate can be positioned on a range of points along the substantially central elongated slot. The invention provides an apparatus that is more secure and flexible than the systems discussed in the background section.

Figure 6:
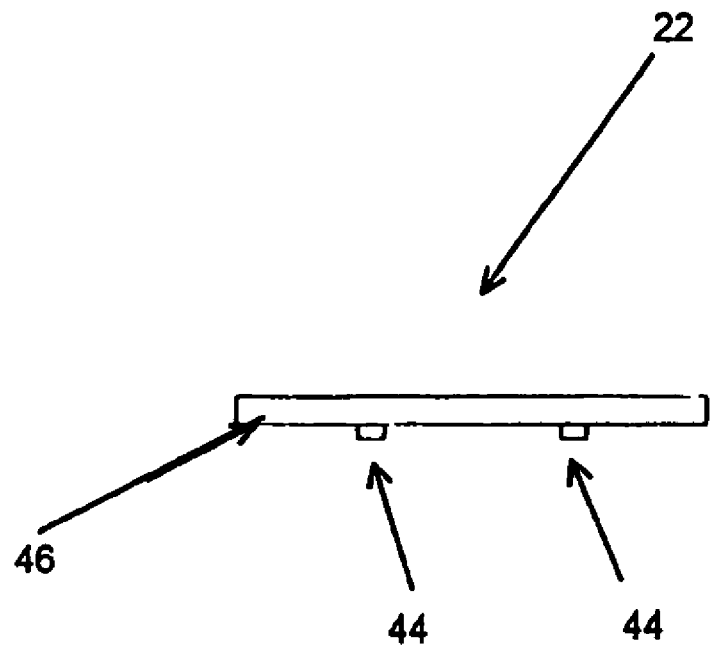
FIG. 6 illustrates a side view of the grip plate of the invention.
Figure 5:
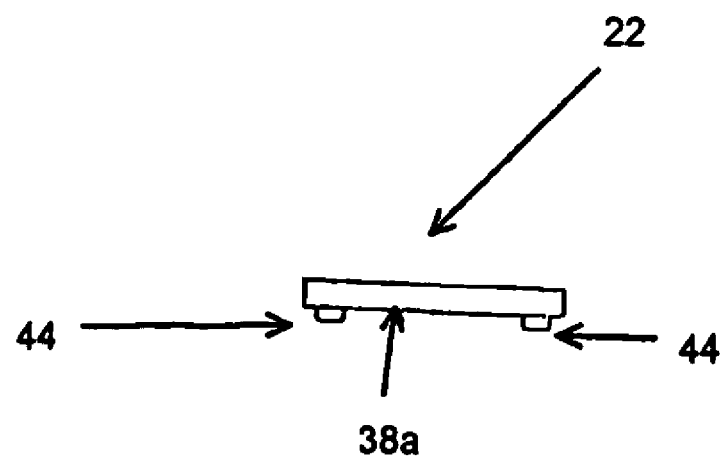
FIG. 5 illustrates an end perspective view of the grip plate of the invention.

FIG. 1 shows a wall mounting system 10 of the present invention having an angled member 12 having a screen connection component 14 with a substantially central elongated slot 18 and a plurality of grip plate holes (or recesses/voids/depression or in opposite configuration, lands/protrusions, with the grip plate having holes/recesses/voids/depressions to accommodate the aforementioned lands/protrusions) 20 adjacent to the substantially central elongated slot 18, a foundation connection component (or bracket) 16, and a grip plate (or an anti-slip/grip) plate 22 having a middle portion with a plurality of screw holes/apertures 42 (seen more clearly in FIG. 4) and periphery portions 40 with a plurality of protrusions 44 near at least one periphery portion 40. See also, FIGS. 4-6. Providing apertures 42 in multiple sizes, allows for different sized fasteners. In addition, by providing protrusions 44 on both sides of the apertures, the plate may be used upside down, which allows the different sized apertures 44 to align in different places, providing more alignment options.

FIG. 1 also shows that the angled member 12 of the present invention has two component parts. One component part of the angled member 12 is the screen connection component 14. The screen connection component 14 has a substantially central elongated slot 18 and a plurality of grip plate holes 20 adjacent to or part of the substantially central elongated slot 18. The grip plate holes 20 must have a depth and diameter sufficient to permit the protrusions 44 from a grip plate 22 to fit into or grip the grip plate hole.

FIG. 7a is a perspective view showing a grip plate 22 positioned to fit into an angled member 12 having grip plate holes 20. FIGS. 7b is an exploded view of a portion of FIG. 7a marked by circle A. In FIG. 7b, the protrusions 44 on the grip plate 22 are shown as fitting into the grip plate holes 20, and a screw 24 positioned to fit in its corresponding sized screw hole 42 on the grip plate 22; thereby, connecting or attaching the anti-slip grip bracket.

The grip plate holes, while shown in the drawings as circular, can be any shape so long as the protrusions on the grip plate can fit into and grip the grip plate hole. For example, and not as a limitation, the grip plate holes can be a square shape, a triangular shape, a slotted shape or an irregular shape. While the grip plate holes are shown apart from the substantially central elongated slot, the grip plate holes can be a part of the elongated slot. For example, the grip plate holes can be a series of spaced apart channels that intersect the substantially elongated slot. The grip plate holes can be a zig zag shape on the borders of the elongated slot similar to that of a saw blade. There are a wide variety of shapes that can serve as grip plate holes.

The screen connection component 16 can have more than one substantially central elongated slot as shown in FIG. 1. The plurality of grip plate holes 20 can be adjacent to or part of one side of the substantially central elongated slot 18 as shown in FIG. 1 or can be adjacent to or part of both sides of the substantially central elongated slot 18 (not shown). The plurality of grip plate holes 20 can run along a section or sections of the substantially central elongated slots 18 as shown in FIG. 1 or along the entire length of the screen connection component 14 adjacent to the substantially central elongated slots (not shown).

Figure 2:
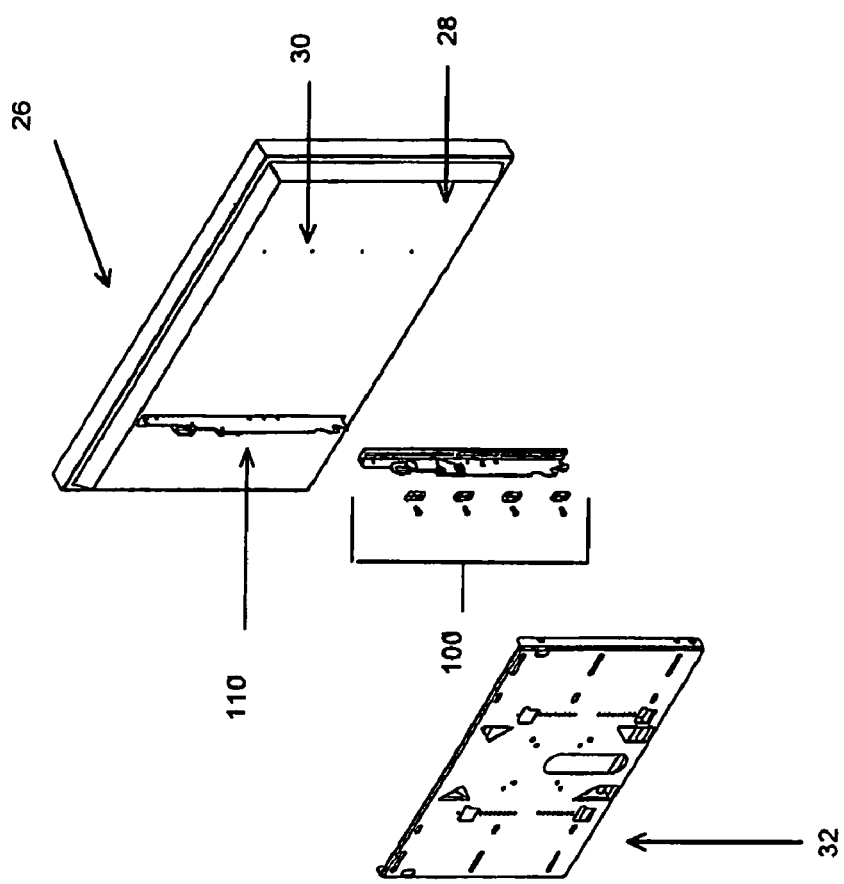
FIG. 2 illustrates an exploded view of an anti-slip grip bracket of the invention, a foundation, and the back of a plasma video screen, along with another anti-slip grip bracket already connected to the back of the plasma video screen.

The other component of the angled member 12 is the foundation connection component 16 that attaches the anti-slip grip bracket 10 to a wall, ceiling, or other structure (not shown). In FIG. 2, two anti-slip grip brackets 100 and 110 are shown; these anti-slip grip brackets are the same as the anti-slip grip bracket 10 that is shown in greater detail in FIG. 1. The foundation connection component can attach directly to a wall. Or in most circumstances, the foundation connection component attaches to a foundation or base, and the base attaches to a wall.

It is preferable that the angled member 12 be perpendicular. The foundation connection component can be perpendicular to the screen connection component that fits against the back 28 of the video screen 26. See FIG. 1-2. The composition from which the angled member is made must be structurally sound so as to hold the weight of the video screen when it is attached to the anti-slip grip bracket. The angled member of the present invention can be made of ferrous and non-ferrous metals; plastic such as ABS/fiber filled; or a composite such as fiberglass or carbon fiber.

Grip plates 22 and screws 24 of the present invention connect the angled member to the back of the flat video screen. FIGS. 1-2. The grip plate 22 of the invention has a middle portion 34 with a plurality of screw holes 42 and periphery portions 40a and 40b with a plurality of protrusions 44 (see FIG. 7b). The periphery portions are also referred herein as a first periphery portion and a second periphery portion. The protrusions 44 are spaced apart to fit into the plurality of grip plate holes 20 of the screen connection component/bracket 16. (not shown). In FIG. 4, the end portions of the grip plate are shown as 38a and 38b. Note that the holes and protrusions can be reversed so that the bracket has the protrusions and the grip plate has the holes. It is preferable that the two plates (bracket and grip) have mating elements which lock each other from relative movement when in contact with each other, without the need for a fastener to lock movement. The fastener is only important to keep the plated from separating from each other. In short, the preferred system diverts gripping forces from the fastener to the interlocking/mating of the two plates by various means. The force is thus diverted to a shear force on the protrusions and holes.

Therefore any means by which the plate and bracket are immobilized from movement relative to each other, will achieve the desired result, which is: to allow for precise selection of the mounting position of the bracket on the device (such as video screen). The closer these engagement points are to each other adjacent the slot, the greater number of alignment positions possible. In all cases this system will provide a vastly larger number of alignment positions than merely drilling a large number of adjacent apertures in the bracket because the aperture for the fastener will usually be larger than the points of engagement.

Furthermore, the tightness required for the fastener to be effective is much reduced since the load of the device (such as video screen) is born primarily by the engagement points and not the fastener.

The plurality of protrusions 44 on the grip plate 22 includes, but is not limited to, the following examples: two protrusions on a first periphery portion, and none on a second portion; two protrusions on the first periphery portion, and one protrusion on the second periphery portion; two protrusions on the first periphery portion and two protrusions on the second periphery portion; and so forth (not shown).

The grip plate 22 of the present invention can have a single screw hole 42 in the middle portion 34. (not shown) It is preferable, however, that the grip plate 22 have a plurality of screw holes 42 in the middle portion 34. FIG. 4. It is also preferable that the pluralities of screw holes correspond to a different size screw as shown in FIG. 4.

The grip plate must be able to grip the grip plate holes, and reliably support and connect to the video screen in the present invention. The preferred grip plate of the present invention has been made from aluminum. However, the grip plate can be made of other non-ferrous or ferrous metals; plastic, such as ABS/fiber filled; or a composite such as fiberglass or carbon fiber. The grip plate can be made by any of a number of standard methods in the industry including but not limited to laser cut, plasma cut, water jet cut, or punch.

The screen connection component 16 connects and aligns a flat video screen, such as a plasma television, by using the grip plates 22 of the present invention. See FIG. 1-3. The screen connection component 16 fits against the back 28 of the flat video screen 26. FIG. 2. The grip plates fit on top of the screen connection component 16, and a screw 24 fits through one of a plurality of screw holes 42 in the middle portion of the grip plate 36.

The method of connecting the anti-slip grip bracket of the present invention to a flat video screen is described below. The user or installer aligns the screen connection component 14 against the back 28 of the flat video screen 26. See FIG. 2.

When aligning the angled member 12, the screen connection component 16 fits against the back 28 of the video screen 26 and one or more video screw holes 30 should be visible within the substantially central elongated slot 18 (not shown). The user selects a hole from the plurality of screw holes 42 that corresponds to the size of the video screw hole 30 in the back 28 of the video screen 26. With the proper screw hole selected, the user aligns the protrusions 44 of the grip plate 22 to fit into the grip plate holes 20 of the screen connection component 16, and the video screw holes 30 should remain visible within the substantially central elongated slot 18 (not shown). The user then tightens a screw 24 through the selected screw hole of the grip plate 22 into the video screen hole 30 that is visible within the substantially central elongated slot 18, thereby connecting the anti-slip grip bracket to the back 30 of the flat video screen 26 (not shown)

Figure 3:
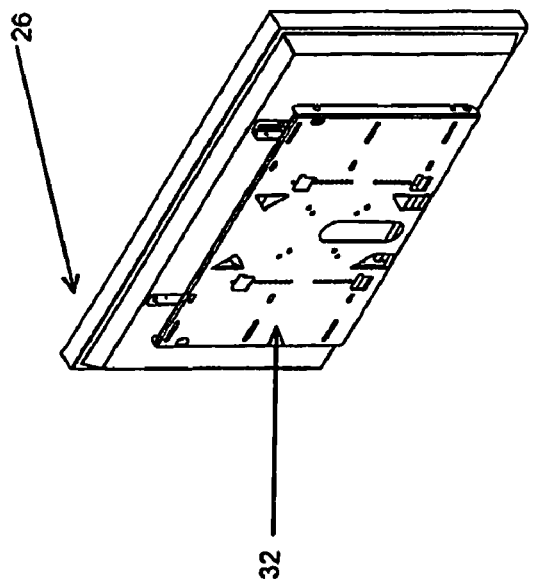
FIG. 3 illustrates the foundation attached to two anti-slip grip brackets connected to the back of the plasma video screen.

The user repeats the above procedure of aligning and tightening the screws for each grip plate that connects the video connection portion to the video holes on the back of the flat video screen. As shown in FIG. 1-3, four grip plates are used in this illustration to connect an angled member to the back of the flat video screen. The invention contemplates that a plurality of grip plates can be used including two or more grip plates. As the number of grip plates increases, the security of the attachment to the video screen likewise increases.

As shown in FIGS. 2-3, the above mounting procedure typically involves using two anti-slip grip brackets 100 and 110 of the present invention. The anti-slip grip brackets 100 and 110 are spaced apart over the video screen screw holes 30 (not shown for 110) on the back of the video screen 28, and each anti-slip grip bracket connects to a base 32 as shown in FIG. 2-3. The foundation 32 shown in the figures is a separate piece from the wall or other structure. However, the foundation to which the foundation connection component of the invention connects, can be the actual wall or other structure, if a secure connection can be made in that fashion.

An example of an alternate embodiment of the invention (not shown) is a mirror image modification that also accomplishes the function of being an anti-slip grip plate or grip plate of the invention. In this alternate embodiment, 1) the grip plate would have a plurality of grip holes that replace the protrusions on a grip plate; and 2) the screen connection component would have a plurality of protrusions that replace the grip holes, as discussed in the above preferred embodiments. In this embodiment, the grip holes on grip plate and protrusions on the screen connection component would function in the same manner of the invention, thereby preventing slippage, minimizing the over torque tendency of screws and slots, and allowing for flexible adjustment along a range.

An alternate embodiment of the invention is an anti-slip grip bracket for mounting a device having screw holes on the back of the device, to a foundation comprising: a) an angled member having a device connection component that fits against the back of the device, and a foundation connection component that connects to the foundation; b) the device connection component having a substantially central elongated slot and a plurality of protrusions adjacent to the substantially central elongated slot; and c) a grip plate having a middle portion and periphery portions, said middle portion having a screw hole and a plurality of grip plate holes near at least one of the periphery portions, and said grip plate holes spaced apart to fit into the plurality of protrusions of the device connection component.

The alternate embodiments, like the others embodiments that precede them, can include embodiments having, but not limited to: an anti-slip grip bracket with a foundation connection component that is perpendicular to the device connection component; a grip plate having a plurality of screw holes; and a grip plate with the plurality of screw holes with each screw hole corresponding to a different size screw. As discussed, the preferred features also apply to the alternate embodiments.

A variety of different permutations of the invention is contemplated, and the permutations are not meant to be limited by this disclosure. The present invention is not limited to the preferred embodiments described in this section. The embodiments are merely exemplary, and one skilled in the art will recognize that many others are possible in accordance with this invention.

Having thus described the invention, it should be apparent that numerous modifications and adaptations can be resorted to without departing from the scope and fair meaning of the instant invention as set forth herein above and as described below by the claims.

Although the present invention has been described in considerable detail with reference to certain preferred versions thereof, other versions are possible. Therefore, the spirit and scope of the appended claims should not be limited to the description of the preferred versions described herein.

All features disclosed in the specification, including the claims, abstract, and drawings, and all the steps of any method or process disclosed, may be combined in any combination, except combinations where at least some of such features and/or steps are mutually exclusive. Each of the features disclosed in the specification, including the claims, abstract, and drawings, can be replaced alternative features serving the same, equivalent, or similar purposes, unless expressly stated otherwise. Thus, unless expressly stated otherwise, each feature disclosed is one example of a generic series of equivalent or similar features.

The invention claimed is:

1. An anti-slip mounting system for mounting a device to a wall surface, the device having a plurality of mounting holes, to a mounting foundation comprising:
   a) a bracket member attachable to the device to be mounted and detachably connected to said foundation;
   b) said bracket having an elongated slot and a plurality of spaced apart engagement members adjacent to said elongated slot; and
   c) a grip plate having first and second adjacent regions, said first region having an aperture for a fastener and said second region having at least one mating engagement member sized to engage at least one engagement member on said bracket member,
so that said grip plate can receive a fastener which passes through said aperture and said elongated slot and engages said device, while the grip plate engages said bracket member by engagement of said engagement members with each other.

2. The system of claim 1 wherein said engagement member on said plate includes at least one protrusion and the engagement member on said bracket includes a plurality of spaced apart receivers sized to received said protrusion.

3. The system of claim 1 wherein said plate includes a plurality of spaced apart apertures of different diameters to receive different sized fasteners.

4. The system of claim 3 wherein said plate includes at least one protrusion on either side of the apertures, so that the plate may be used upside down.

5. The system of claim 1 wherein said engagement members on said bracket are equally spaced apart.

6. The system of claim 1 wherein said engagement members on said bracket are depressions.

7. The system of claim 1 wherein said plate includes at least two spaced apart engagement members, so that the orientation of the plate is fixed at two points.

8. The system of claim 1 wherein the anti-slip plate has at least four protrusions, two on either side of the aperture.

9. An anti-slip mounting alignment system for mounting a device having fastener receiving holes comprising:
 a) a bracket member attachable to the device to be mounted; said first member having an elongated slot and a plurality of spaced apart engagement members adjacent to said elongated slot; and
 c) an anti slip alignment plate having first and second adjacent regions, said first region having an aperture for said fastener and said second region having at least one mating engagement member configured to engage at least one engagement member on said first bracket member,
whereby said alignment plate aperture and said elongated slot are alignable to receive a fastener with said engagement members being engaged to prevent movement of said plate relative to said bracket.

10. The system of claim 9 wherein said engagement member on said plate includes at least one protrusion and the engagement member on said bracket includes a plurality of spaced apart receivers sized to received said protrusion.

11. The system of claim 9 wherein said plate includes a plurality of spaced apart apertures of different diameters to receive different sized fasteners.

12. The system of claim 11 wherein said plate includes at least one protrusion on either side of the apertures, so that the plate may be used upside down.

13. The system of claim 9 wherein said engagement members on said bracket are equally spaced apart.

14. The system of claim 9 wherein said engagement members on said bracket are depressions.

15. The system of claim 9 wherein said plate includes at least two spaced apart engagement members, so that the orientation of the plate is fixed at two points.

16. The system of claim 9 wherein the anti-slip plate has at least four protrusions, two on either side of the aperture.

17. A method of aligning and fastening a bracket to a device having a fastener receiver, with a fastener comprising the steps of:
 a) providing a bracket having an elongated slot and a plurality of engagement points adjacent to and spaced part along said slot;
 b) providing a grip plate having an aperture for a fastener and a plurality of engagement points mateable with said engagement points of said bracket;
 c) mating said engagement points on the grip plate and bracket at the desired position, to immobilize the grip plate relative to the bracket, thereby causing the aperture to align with the slot;
 d) inserting a fastener through said aperture and slot and into said fastener receiver to secure said device to said bracket.

18. The method of claim 17 further including the step of locating the engagement points on the bracket and grip plate adjacent to but not intersecting the elongated slot or the aperture respectively.

19. A method of minimizing the required torque on an attachment fastener to prevent slippage between a bracket and a device to be attached to the bracket, comprising the steps of:
 a) providing a bracket having an elongated slot and a plurality of engagement points adjacent to and spaced part along said slot;
 b) providing a grip plate having an aperture for a fastener and a plurality of engagement points mateable with said engagement points of said bracket;
 c) mating said engagement points on the grip plate and bracket at the desired position, to immobilize the grip plate relative to the bracket, thereby preventing slippage between the bracket and the device;
 d) inserting a fastener through said aperture and slot and into said fastener receiver to secure said device to said bracket.

20. The method of claim 19 further including the step of locating the engagement points on the bracket and grip plate adjacent to but not intersecting the elongated slot or the aperture respectively.

21. An anti-slip mounting system for mounting a device to a wall surface, the device having a plurality of mounting holes, to a mounting foundation comprising:
 a) a bracket member attachable to the device to be mounted and detachably connected to said foundation;
 b) said bracket having an elongated slot and a plurality of spaced apart engagement members adjacent to said elongated slot; and
 c) a grip plate having first and second adjacent regions, said first region having an aperture for a fastener and said second region having at least one mating engagement member sized to engage at least one engagement member on said bracket member,
so that said grip plate can receive a fastener which passes through said aperture and said elongated slot and engages said device, while the grip plate engages said bracket member by engagement of said engagement members with each other and
wherein said mating engagement member on the grip plate include at least one land projecting substantially orthogonally therefrom, said land be adjacent to but not intersecting said grip plate aperture, and wherein the engagement members on the bracket include a plurality of spaced apart holes in a line adjacent to but not intersecting the elongated slot, said holes being sized to receive said at least one land.

22. The system of claim 21 wherein the lands are cylindrical and the holes are round.

23. An anti-slip mounting alignment system for mounting a device having fastener receiving holes comprising:
 a) a bracket member attachable to the device to be mounted; said first member having an elongated slot and a plurality of spaced apart engagement members adjacent to said elongated slot; and
 c) an anti slip alignment plate having first and second adjacent regions, said first region having an aperture for said fastener and said second region having at least one mating engagement member configured to engage at least one engagement member on said first bracket member,
whereby said alignment plate aperture and said elongated slot are alignable to receive a fastener with said engagement members being engaged to prevent movement of said plate relative to said bracket and wherein
wherein said mating engagement member on the anti slip plate include at least one land projecting substantially orthogonally therefrom, said land be adjacent to, and wherein the engagement members on the bracket include a plurality of spaced apart holes in a line adjacent to but not intersecting the elongated slot, said holes being sized to receive said at least one land.

24. The system of claim 23 wherein the lands are cylindrical and the holes are round.

* * * * *